Patented Nov. 16, 1948

2,454,056

UNITED STATES PATENT OFFICE 2,454,056

ALUMINUM PHOSPHATE BINDER AND METHOD FOR PREPARING THE SAME

Herbert H. Greger, Washington, D. C.

No Drawing. Application September 19, 1944,
Serial No. 554,863

6 Claims. (Cl. 106—287)

This invention relates in general to bonded masses of materials and more particularly has reference to the manufacture of particles of adsorbing material bonded together with a porous bond. The present invention also relates to modified aluminum phosphate binders.

Bauxite or aluminum hydrate, brucite or magnesium hydrate and activated carbon have been found to be very valuable in the filtration art. These materials have been used in the form of loose beds and in the form of bonded shapes. The bonded shapes have many advantages over the loose beds but their efficiency is generally impaired by the material employed for bonding the particles together. The development of a suitable bond is therefore of primary importance.

I have found that a modified aluminum phosphate binder is very suitable for the bonding of adsorbent particles, such as bauxite, into adsorbent shapes. Other granular and fibrous materials may be bonded by the same binder especially where porosity in the final bond is desired, and also in instances where porosity is of no importance. In some cases, such as in the bonding of bauxite, the bonded substance needs treatment prior to bonding. Commercial bauxite, for instance, contains clay as an impurity. This impurity apparently affects the resulting products and must be eliminated by suitable methods.

An object of this invention is to provide a porous aluminum phosphate bond.

Another object of this invention is to provide a method of forming bonded adsorbent shapes of uniform and high porosity, and with intercommunicating channels between bonded particles.

A further object of this invention is to prepare bonded bauxite bodies by first washing the bauxite to remove the major portion of the clay therefrom and then bonding the washed material with an aluminum phosphate binder.

Still another object of this invention is to provide a modified aluminum phosphate binder.

With these and other objects in view, the present invention resides in the concept of forming an aluminum phosphate base binder for the bonding of fibrous and granular materials where a porous bond is desired as in the bonding of adsorbents. Another aspect of the present invention resides in the formation of the porous and water insoluble bond by heat treatment at relatively low temperature. Another phase of the present invention resides in the processing of bauxite by washing to remove therefrom clay or other material that will slake in water, prior to admixture of the bauxite with an aluminum phosphate binder to form a bonded filter block. A further object of the invention resides in the use of aluminum, magnesium, and iron hydrate in the formation of molded adsorbent bodies, bonded with a modified aluminum phosphate binder of the above described type, subsequently setting the binder and activating the adsorbent by heating for removal of water of hydration.

As hereinbefore indicated, the present invention is principally directed to the manufacture of porous adsorbent bodies of various shapes suitable for filtration. In accordance with the present invention, these bodies are made by bonding together particles of adsorbent material such as bauxite, aluminum hydrate, brucite, iron hydrate or activated carbon. In the case of the manufacture of filter bodies or blocks from bauxite, the present invention comprehends the washing of the bauxite to remove therefrom all clay which has a tendency to form slimes when admixed with an aluminum phosphate base binder. The clay impurities in the bauxite may be removed by subjecting the bauxite to a washing action with water under continuous agitation. This may be effected in a suitable washing apparatus with a stream of water running in and being discharged from the same in a continuous manner while the mass is subjected to agitation. It has been found that by subjecting the commercial granular grade of bauxite to washing of this nature for a period of one-half to one hour that most of the clay impurities can be removed therefrom. When starting from ore, directly, a wet crushing and screening process may be used.

During the washing treatment, the water may be drained from the washing apparatus at frequent intervals. For instance, it has been found that by draining the water off about every ten minutes and replenishing with fresh water that an effective removal of the clay can be obtained.

After the bauxite has been subjected to the washing action for the desired period of time, it may be removed from the washing apparatus and introduced into vessels provided with foraminous bottoms to permit the water to drain from the particles of washed material.

Bauxite so washed is then dried, for instance in a rotary dryer, at a temperature of about 250° F. The bauxite is then screened into sizes such as 20-30-40-60-100 and minus 100, and stored in bins.

The bauxite so treated is then mixed with an aluminum phosphate binder and molded under pressure into the desired shapes. These shapes may be stored in green form or may be air dried for a period of about twenty-four hours or more if necessary, and are then fired at a temperature of about 900° F.

For some purposes the washed bauxite may be bonded with a straight or unmodified aluminum phosphate binder, such as a colloidal aluminum phosphate ranging from mono to di-aluminum phosphate. It has been found, however, that for the purpose of this invention greatly improved results are obtained when a modified type of aluminum phosphate binder is applied. Such a modified aluminum phosphate binder, found to be particularly suitable in accordance with the present invention, may be prepared by mixing an organic acid salt with an acid aluminum phosphate such as mono-aluminum phosphate. The organic acid salt should be preferably formed from a metal of group II of the periodic arrangement of elements and the acid should be a strong organic acid, such as oxalic acid, maleic acid, malonic or tartaric acid. It has been found that an organic acid salt formed from one of the above acids and a metal such as calcium, magnesium, or zinc is particularly suitable for combination with colloidal mono-aluminum phosphate for the formation of a binder which sets to a hard, water insoluble mass and which upon heating to a high enough temperature will result in the decomposition of the organic compound resulting in the formation of a porous bond.

More specifically the purpose of the addition of the group II metal salt of an organic acid to an acid aluminum phosphate resides in the need of the phosphate for an additional amount of base for becoming water insoluble, hardened, but at the same time also porous. A further important requirement in the binder is a good workability during mixing and molding, along with a sufficient stability to prevent hardening of the bond by itself during storage for one or two days, whatever the production needs may be.

The aluminum phosphate solution is the colloidal solution of an acid aluminum phosphate principally in the range between the mono and the sesqui aluminum phosphate. The compounds between the sesqui and the di-aluminum phosphate have a special usefulness by forming glassy, water soluble solids for the production of the binder in dry form. One method of preparing these solid water soluble aluminum phosphates is described in Patent No. 2,405,884, issued August 13, 1946, on application Serial No. 494,526 of Herbert H. Greger. These compounds may be prepared from phosphoric acid and powdered aluminum hydrate or a fairly pure grade of bauxite. The concentration of the phosphoric acid may range from 60 to 75 percent in some cases to even 85 percent.

The aluminum phosphate is chemically a very active substance and when an alkaline earth salt of an organic acid, such as calcium oxalate, is added there will be a tendency towards precipitation of calcium phosphate unless this reaction is arrested by the liberation of the organic acid. If this acid is volatile the precipitation will continue; however, the organic acid is so chosen that it is essentially non-volatile under the conditions of preparing and using the binder. The acid must further have sufficient strength to prevent it from becoming displaced by the phosphoric acid.

This last requirement may be roughly illustrated by the dissociation constants of the acids. These constants may vary between that for phosphoric acid $1.1 \times 10^{-2}$, 1st hydrogen, to that for 2nd hydrogen $7.5 \times 10^{-8}$. The practical purposes of the invention will naturally be served best by assuring the maximum of chemical stability of the mixture by using the stronger types of acid, such as oxalic, maleic, tartaric, and the like. Their dissociation contents for the first hydrogen are, respectively $6.5 \times 10^{-2}$, $1.5 \times 10^{-2}$, $1.61 \times 10^{-3}$ and $1.1 \times 10^{-3}$.

A bond suitable for bonding bauxite and other materials in accordance with the present invention may be prepared by mixing about 10 parts by weight of colloidal mono-aluminum phosphate solution, prepared from 75% $H_3PO_4$, with about 3.5 to 4.0 parts by weight of pure calcium oxalate.

For commercial production on a large scale and at low cost, it has been found that a technical grade of calcium oxalate may be employed. It usually contains an excess of free lime and when this is used it is necessary to add oxalic acid to the colloidal aluminum phosphate prior to addition of the calcium oxalate thereto. Such a bond may be prepared by mixing 10 parts by weight of colloidal mono-aluminum phosphate at a temperature of about 140 to about 160° F. with about .56 part by weight of oxalic acid. This amount of oxalic acid will neutralize up to 15% of free lime in the technical grade calcium oxalate. The mass should be mixed until dissolved. After dissolution has been effected, the technical grade of calcium oxalate may be added in a quantity of about 3.8 parts by weight. This mass should then be mixed until smooth and after cooling may then be incorporated with the material to be bonded.

In the manufacture of bauxite blocks suitable for filtering purposes, about 18 parts by weight of washed bauxite of −20+40 mesh and 1 to 2 parts by weight of −60+100 mesh washed bauxite are mixed together with 5.0 parts by weight of the modified aluminum phosphate bond of the type above mentioned. This mass is mixed for about 12 minutes in suitable equipment, such as a Lancaster mixer, and then introduced into a mold. Molding of the mass is then effected under a pressure up to about 4,000 to 5,500 pounds per square inch. After holding the mass at this pressure for a few seconds the pressure is relieved and the block carefully removed from the mold.

The molded block may then be stored and allowed to air dry for a convenient period of time if possible not exceeding 24 hours, before it is fired. In some instances, however, the molded articles were transferred directly from the press to the oven and fired to produce products having desired properties.

After air drying the molded articles may be introduced into an oven at an initial temperature of about 350° F. The temperature is then raised within 90 to 120 minutes to bring the oven up to about 900° F., at which temperature it is held for about 2 hours. The firing of the molded articles at the above mentioned temperature serves to effect a reaction between the calcium oxalate and the aluminum phosphate which causes the aluminum phosphate to form into a water insoluble mass probably consisting of a mixture of aluminum and calcium phosphate. Firing at the above mentioned temperature also serves to break down the organic acid radical and to drive off the same from the mass, resulting in the production of a hard, porous bond, cementing together the particles of the bauxite which are activated at the temperature mentioned, by removing most of their water of hydration.

The temperature for curing the bond and that for activating the adsorbent are not necessarily identical. However, the bond is a very heat stable material and once it is cured it will not be affected by further heating in the temperature range commonly used in the activation of adsorbents. The temperature range for activating bauxite or aluminum hydrate is between about 900 and about 1200° F., for general purposes of adsorption, but for the adsorption of moisture this temperature does not usually exceed about 750 to about 800° F.

The curing temperature for the bond itself is in the range of 450 to 550° F. and bonded shapes which need no heating beyond this point can be cured in this temperature range or in some cases even below it. Examples would include, bonded articles of activated carbon, or insulating materials made from asbestos, glass fiber, rock wool, articles from wood fiber and the like. In fact the properties of the bond permit a wide range of applications.

The simplicity of applying the new binder is such that the user will have no trouble in the mechanics of the application. He should, however, guard against chemical incompatibility of materials. The aluminum phosphate component of the bond is acidic and becomes basic only after the bond is cured by drying and heating and by eliminating the organic acid radical in the mixture. If it is intended to bond a basic substance, such as for instance, magnesium oxide or magnesium hydroxide, certain precautions must be taken. These consist essentially in working rapidly and by limiting the mesh sizes to the coarser fractions. It is, however, important to note that in cases of this kind the organic acid salt acts as a buffer and retards the rate of the reaction to reasonable proportions. It was found that in some cases the straight aluminum phosphate binder sets up too rapidly while the modified binder showed good handling properties. Obviously in the case of the bonded magnesia some of this will enter into the reaction with the phosphate.

The addition of a minor quantity of fluorine such as $CaF_2$ or $NH_4F$, further lead salts, lead oxalate, or lead acetate, leads sometimes to further improvements, for instance where the most exacting requirements for insolubility in water at elevated temperature must be met as in the presence of super heated steam.

The examples of binder herein described are compounded proportions of acid aluminum phosphate and calcium oxalate to give tri-calcium phosphate and a slight excess of lime if all of the phosphoric acid radical present in the aluminum phosphate base is transformed into tri-calcium phosphate. Some variations in the lime content are permissible, but this should not be decreased below the amount necessary to form the di-calcium phosphate in a general purpose binder. For the bonding of adsorbents the lime content for tri-calcium phosphate proved satisfactory.

A binder of this type may also be prepared in solid form as a mixture of a powdered water soluble solid aluminum phosphate together with powdered calcium oxalate. Such a cement may be packaged in water proof bags or metal cans and in this form has a distinct advantage over the aluminum phosphate base in liquid form and in a separate package from the organic acid salt.

In the bonding of adsorbents it should be noted that this modified aluminum phosphate binder has given some very consistent and good adsorption efficiencies in the bonded article. This is in definite contrast with other binders that were tried during the development of the principle embodied in the modified aluminum phosphate binder.

An adsorbent develops an ultramicroscopic porosity during its activation or treatment to render it adsorbent. It will be appreciated that these pores must continue through the bond to the surface of the bond in order to permit the adsorbent to function. The high adsorption efficiency which bauxite and alumina blocks have shown clearly indicates that the necessary system of intercommunicating pores exists to a high degree in bonded adsorbents prepared in accordance with this invention. It will be also appreciated that this condition is helped by the use of the original hydrates of the adsorbents. Only in the case of carbon which is hydrophobic, is it possible to obtain good results with an adsorbent already activated prior to binding. The hydrophobic properties prevent any notable penetration of the binder into the pores.

The binder consisting of the modified aluminum phosphate is not only effective for the bonding of the washed bauxite, but is very effective for the bonding of aluminum hydrate, magnesium hydrate and activated carbon. It is particularly suitable for the bonding of particles of activatable adsorbent materials because of the porous nature of the final bond. The modified binder is also suitable for binding fiber glass, especially for the production of insulating pipe covering compositions. Aside from this use of the modified aluminum phosphate binder, it has also been found suitable for the bonding together of asbestos such as chrysotile or crosidolite and other granular and fibrous materials.

From the foregoing description it will be appreciated that the present invention provides a highly useful binder, especially suitable for the formation of porous bonded masses highly useful in the filtration and insulation arts and for other purposes.

I claim:

1. A method of making an aluminum phosphate binder consisting essentially of mixing a colloidal aqueous solution of mono-aluminum phosphate with calcium oxalate at a temperature of about 140° F. to 160° F., said calcium oxalate being present in quantities liberating sufficient oxalic acid on mixing with the mono-aluminum phosphate to arrest the precipitation of calcium phosphate.

2. A method of making an aluminum phosphate binder consisting essentially of mixing about ten parts by weight of a colloidal aqueous solution of mono-aluminum phosphate prepared from aluminum hydrate and 75% phosphoric acid with about 3.8 parts by weight calcium oxalate at a temperature of about 140° F. to 160° F.

3. A method of making an aluminum phosphate binder consisting essentially of mixing at about 140° F. to 160° F. about ten parts by weight of an aqueous solution of mono-aluminum phosphate prepared from 75% phosphoric acid and aluminum hydrate with about .56 part by weight of oxalic acid, and then adding thereto about 3.8 parts by weight of technical grade calcium oxalate.

4. An aluminum phosphate binder consisting essentially of an aqueous aluminum phosphate solution and calcium oxalate, said calcium oxalate being present in quantities liberating sufficient oxalic acid on mixing with the aluminum phosphate solution to stabilize the binder by arresting the precipitation of calcium phosphates.

5. An aluminum phosphate binder consisting essentially of an aqueous aluminum phosphate solution and a salt of a metal of group II of the periodic arrangement of the elements and a strong organic acid, said salt being present in quantities liberating sufficient organic acid on mixing to stabilize the binder by preventing the precipitation of a phosphate of the metal group II of the periodic arrangement of the elements.

6. An aluminum phosphate binder consisting essentially of about 10 parts by weight of an aqueous solution of mono-aluminum phosphate prepared from aluminum hydrate and 75% phosphoric acid and about 3.8 parts by weight calcium oxalate.

HERBERT H. GREGER.

REFERENCES CITED

The following references are of record in the file of this patent:

UNITED STATES PATENTS

| Number | Name | Date |
| --- | --- | --- |
| 1,789,766 | Stoewener | Mar. 31, 1931 |
| 1,846,806 | Heppner | Feb. 23, 1932 |
| 2,196,971 | Boughton et al. | Apr. 16, 1940 |

Certificate of Correction

Patent No. 2,454,056.

November 16, 1948.

HERBERT H. GREGER

It is hereby certified that error appears in the printed specification of the above numbered patent requiring correction as follows:

Column 7, line 10, claim 5, for the words "metal group" read *metal of group*; and that the said Letters Patent should be read with this correction therein that the same may conform to the record of the case in the Patent Office.

Signed and sealed this 18th day of January, A. D. 1949.

[SEAL]

THOMAS F. MURPHY,
*Assistant Commissioner of Patents.*